United States Patent
Zhu et al.

(10) Patent No.: US 8,981,319 B2
(45) Date of Patent: *Mar. 17, 2015

(54) SYSTEM FOR MEASURING LIGHT INTENSITY DISTRIBUTION

(71) Applicants: Tsinghua University, Beijing (CN); Hon Hai Precision Industry Co., Ltd., New Taipei (TW)

(72) Inventors: Jun Zhu, Beijing (CN); Jing-Lei Zhu, Beijing (CN); Kai-Li Jiang, Beijing (CN); Chen Feng, Beijing (CN); Ji-Qing Wei, Beijing (CN); Guo-Fan Jin, Beijing (CN); Shou-Shan Fan, Beijing (CN)

(73) Assignees: Tsinghua University, Beijing (CN); Hon Hai Precision Industry Co., Ltd., New Taipei (TW)

( * ) Notice: Subject to any disclaimer, the term of this patent is extended or adjusted under 35 U.S.C. 154(b) by 0 days.

This patent is subject to a terminal disclaimer.

(21) Appl. No.: 13/729,285

(22) Filed: Dec. 28, 2012

(65) Prior Publication Data

US 2013/0327960 A1      Dec. 12, 2013

(30) Foreign Application Priority Data

Jun. 12, 2012  (CN) .................. 2012 1 01920632

(51) Int. Cl.
*G01J 1/58* (2006.01)
*G01J 1/42* (2006.01)
(Continued)

(52) U.S. Cl.
CPC .................. *G01J 1/58* (2013.01); *G01J 1/4257* (2013.01); *G01J 1/0411* (2013.01); *G01J 1/08* (2013.01); *G01J 1/4228* (2013.01); *G01J 2001/4247* (2013.01)

USPC ........................................................ 250/461.1

(58) Field of Classification Search
CPC ................ G01J 1/02; G01J 4/00; G01J 5/023
USPC ........................................................ 250/461.1
See application file for complete search history.

(56) References Cited

U.S. PATENT DOCUMENTS 5,065,023 A * 11/1991 Lindmayer .................. 250/330
8,077,318 B2 * 12/2011 Luo et al. ..................... 356/445

(Continued)

FOREIGN PATENT DOCUMENTS

TW         587156       5/2004
TW         591216       6/2004

(Continued)

OTHER PUBLICATIONS

"Electronic diagnostics system for the analysis of laser beam profile", Bushra. R. Mehdi et al., Iraqi Journal of Physics, 2011, vol. 9, No. 16, pp. 1-5.

*Primary Examiner* — Marcus Taningco
(74) *Attorney, Agent, or Firm* — Novak Druce Connolly Bove + Quigg LLP

(57) ABSTRACT

A system for measuring intensity distribution of light includes a carbon nanotube array located on a surface of a substrate, a reflector and an imaging element. The carbon nanotube array absorbs photons of a light source and radiates a visible light. The reflector is used to reflect the visible light, and the reflector is spaced from the carbon nanotube array. The carbon nanotube array is located between the reflector and the substrate. The imaging element is used to image the visible light. The imaging element is spaced from the substrate.

19 Claims, 3 Drawing Sheets

(51) Int. Cl.
*G01J 1/04* (2006.01)
*G01J 1/08* (2006.01)

(56) References Cited

U.S. PATENT DOCUMENTS

| | | |
|---|---|---|
| 8,110,883 B2 * | 2/2012 | Ward et al. .................... 257/428 |
| 8,665,429 B2 * | 3/2014 | Jiang et al. .................... 356/213 |
| 2003/0173985 A1 | 9/2003 | Cole et al. |
| 2005/0040314 A1 | 2/2005 | Kuo |
| 2007/0062411 A1 * | 3/2007 | Weisman et al. ........... 106/31.15 |
| 2010/0065190 A1 * | 3/2010 | Cheng et al. .................. 156/152 |
| 2010/0209632 A1 * | 8/2010 | Weisman et al. ............... 428/29 |
| 2010/0296088 A1 * | 11/2010 | Xiao et al. .................... 356/319 |

FOREIGN PATENT DOCUMENTS

| | | |
|---|---|---|
| TW | 200936992 | 9/2009 |
| TW | 201011266 | 3/2010 |
| TW | 201043933 | 12/2010 |
| WO | WO2009147908 | 12/2009 |

* cited by examiner

SYSTEM FOR MEASURING LIGHT INTENSITY DISTRIBUTION

RELATED APPLICATIONS

This application claims all benefits accruing under 35 U.S.C. §119 from China Patent Application No. 201210192063.2, filed on Jun. 12, 2012 in the China Intellectual Property Office. This application is related to commonly-assigned application entitled, "METHOD FOR MEASURING LIGHT INTENSITY DISTRIBUTION", filed Dec. 28, 2012, U.S Ser. No 13/729,300; "SYSTEM FOR MEASURING LIGHT INTENSITY DISTRIBUTION", filed Dec. 28, 2012, U.S Ser. No. 13/729,279; "METHOD FOR MEASURING LIGHT INTENSITY DISTRIBUTION", filed Dec. 28, 2012, U.s Ser. No. 13/729,522. Disclosures of the above-identified applications are incorporated herein by reference.

BACKGROUND

1. Technical Field

The present application relates to a system for measuring light intensity distribution.

2. Discussion of Related Art

To measure the intensity distribution of a light source, a sensor is put in a position away from the light source. Then the sensor is moved around a circumference of a circle with the light source at the circle center. It is necessary to move the sensor to obtain a plurality of test data while measuring an intensity distribution of the light source.

The sensors used in measuring intensity distribution of light can be classified into two types: thermal and photonic. The thermal sensors are low-cost and can be operated at room temperature but have low sensitivity and low response speed. The photonic sensors have high sensitivity and high response speed. However, the photonic sensors are expensive and cannot operate at room temperature.

What is needed, therefore, is to provide a system for measuring intensity distribution of a light at room temperature with high sensitivity and resolution.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
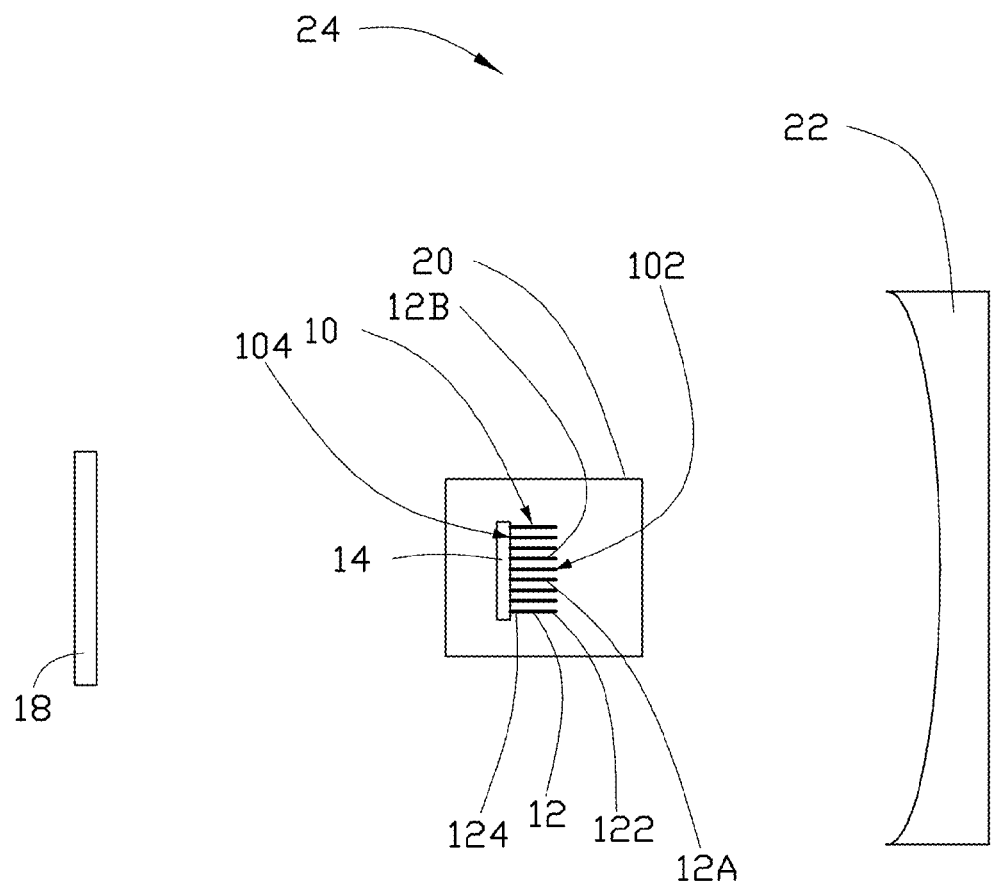
FIG. 1 is a schematic view showing a system of one embodiment for measuring light intensity distribution.

FIG. 1 is a system 24 for measuring light intensity distribution of one embodiment. The system 24 includes a carbon nanotube array 10 located on a surface of a substrate 14, a reflector 22 and an imaging element 18. The carbon nanotube array 10 is located between the reflector 22 and the substrate 14, wherein the carbon nanotube array 10 is spaced from the reflector 22. The substrate 14 is located between the carbon nanotube array 10 and the imaging element 18, wherein the imaging element 18 spaces from the substrate 14.

A chemical vapor deposition process in one embodiment, fabricates the carbon nanotube array 10. The chemical vapor deposition process includes the steps of:

(S1), providing a substantially flat and smooth substrate 14, wherein the substrate 14 can be a P-type silicon substrate, an N-type silicon substrate, or a silicon substrate having oxide layer disposed thereon. In one embodiment, the substrate 14 is a P-type silicon substrate having a width of about 4 inches;

(S2), forming a catalyst on the surface of the substrate 14, wherein the catalyst can be made of iron, cobalt, nickel, or any combination alloy thereof;

(S3), annealing the substrate 14 with the catalyst at a temperature ranging from about 700° C. to about 900° C. in air for about 30 minutes to about 90 minutes;

(S4), heating the substrate 14 with the catalyst at a temperature ranging from about 500° C. to about 740° C. in a furnace with a protective gas therein; and (S5), supplying a carbon source gas to the furnace for about 5 minutes to about 30 minutes and growing the carbon nanotube array 10, wherein the carbon source gas may be hydrocarbon gas, such as ethylene, methane, acetylene, ethane, or any combination thereof.

Moreover, the carbon nanotube array 10 formed under the above conditions is essentially free of impurities such as carbonaceous or residual catalyst particles.

The carbon nanotube array 10 includes a plurality of carbon nanotubes 12 parallel to each other. The plurality of carbon nanotubes 12 may be single-walled, double-walled, multi-walled carbon nanotubes, or their combinations. The carbon nanotubes 12 which are single-walled have a diameter of about 0.5 nanometers (nm) to about 50 nm. The carbon nanotubes 12 which are double-walled have a diameter of about 1.0 nm to about 50 nm. The carbon nanotubes 12 which are multi-walled have a diameter of about 1.5 nm to about 50 nm. The plurality of carbon nanotubes 12 has a height of about 100 nm to about 10 millimeters (mm), for example, the height of the plurality of carbon nanotubes 12 is 100 microns, 500 microns, 1000 microns or 5 mm. In one embodiment, the plurality of carbon nanotubes 12 is multi-walled carbon nanotube and has a height of about 100 microns to about 1000 microns.

Figure 3:
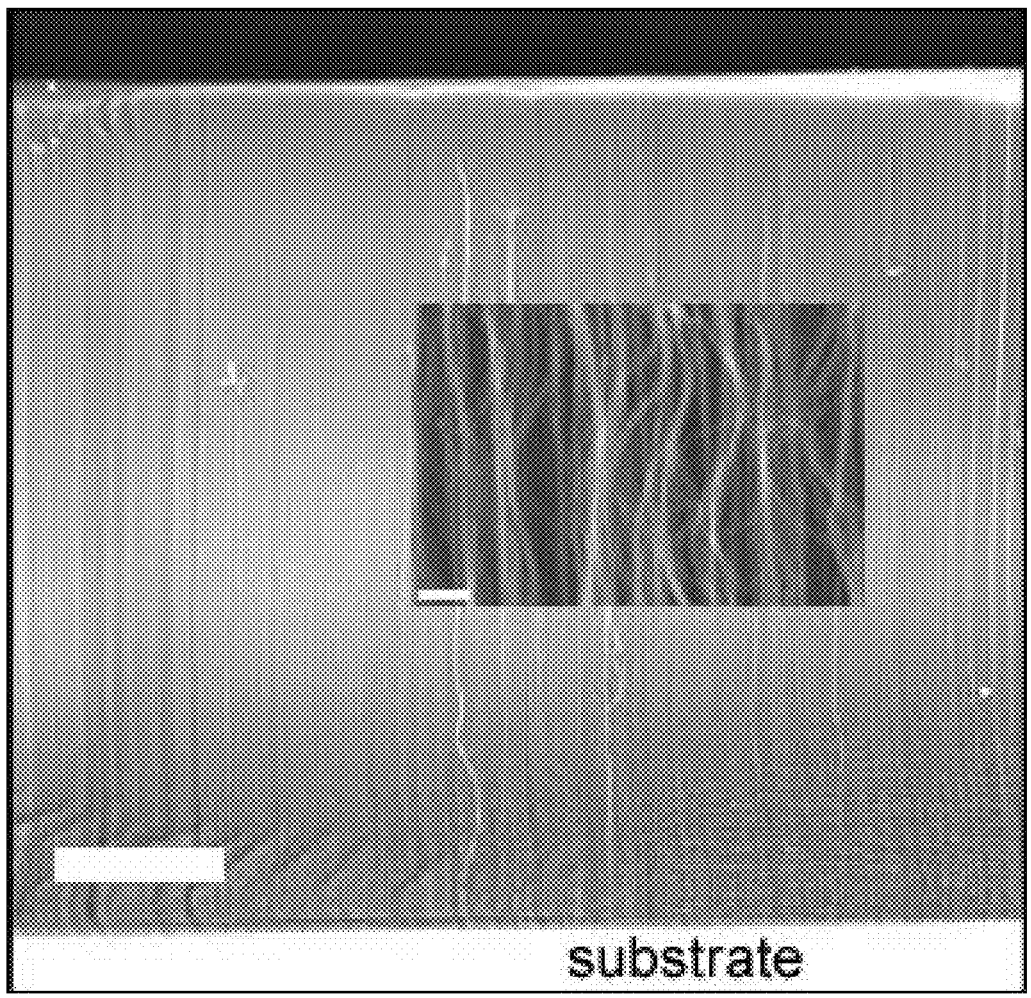
FIG. 3 shows a scanning electron microscope (SEM) image of a carbon nanotube array.

An angle between the plurality of carbon nanotubes 12 and the surface of the substrate 14 can be in a range from about 10 degrees to about 90 degrees. In one embodiment, the angle between the plurality of carbon nanotubes 12 and the surface of the substrate 14 is in a range from about 60 degrees to about 90 degrees. FIG. 3 shows that in one embodiment, the plurality of carbon nanotubes 12 is perpendicular to the surface of the substrate 14. An interspace between adjacent two of the carbon nanotubes 12 can be in a range from about 0.1 nm to about 0.5 nm. The plurality of carbon nanotubes 12 includes a first end and a second end opposite to the first end. The first ends of the plurality of carbon nanotubes 12 are away from the substrate 14, and the second ends of the plurality of carbon nanotubes 12 connect to the surface of the substrate 14.

The plurality of carbon nanotubes 12 in the carbon nanotube array 10 is pressed using a compressing apparatus, to form the angle between the plurality of carbon nanotubes 12 and the surface of the substrate 14, wherein the angle is less than 90 degrees. In detail, a certain pressure can be applied to the carbon nanotube array 10 by the compressing apparatus. In one embodiment, the compressing apparatus can be a pressure head having a glossy surface. When a planar pressure head is used to press the carbon nanotube array along a pressing direction slanted to the surface of the substrate 14, the angle between the plurality of carbon nanotubes 12 and the surface of the substrate 14 will be obtained. The pressure and the pressing direction can, opportunely, determine a size of the angle between the plurality of carbon nanotubes 12 and the surface of the substrate 14.

The carbon nanotube array 10 with the substrate 14 can be in an inertia environment or a vacuum environment. In one embodiment, the carbon nanotube array 10 with the substrate 14 is located in a chamber 20. The chamber 20 is made of light-transparent materials, such as glass, resin or zinc selenide (ZnSe). The chamber 20 can be filled with nitrogen, ammonia or inertia gas. In another embodiment, a pressure in the chamber 20 can be in a range from about $10^{-9}$ to about $10^{-3}$ Pa.

The carbon nanotube array 10 can be transferred from the substrate 14 to other bases. The plurality of carbon nanotubes 12 in the carbon nanotube array 10 is parallel to each other when the carbon nanotube array 10 is separated from the surface of the substrate 14 and located on other bases. Angles between the plurality of carbon nanotubes 12 and a surface of other bases can be still in a range from about 10 degrees to about 90 degrees. Other bases can be made of opaque materials, such as metal, ceramic or resin.

The carbon nanotube array 10 has a top surface 102 and a bottom surface 104 opposite to the top surface 102. Each of the plurality of carbon nanotubes 12 has a top end 122 and a bottom end 124 opposite to the top end 122. The top end 122 of each of the carbon nanotubes 12 is close to the light source. The bottom end 124 of each of the carbon nanotubes 12 is away from the light source and connects to the substrate 14. Each of the carbon nanotubes 12 orients along a direction from the bottom surface 104 to the top surface 102 of the carbon nanotube array 10.

Each of the carbon nanotubes 12 has heat conduction anisotropy. Heat is conducted along the axes of the carbon nanotubes 12 and is hardly conducted along a direction vertical to the axes of the carbon nanotubes 12. Therefore, when the carbon nanotube array 10 radiates visible light, the top surface 102 and the bottom surface 104 of the carbon nanotube array 10 radiates more visible light. Side surfaces of the carbon nanotube array 10 hardly radiate visible light, wherein the side surface is parallel to the axes of the carbon nanotubes 12. Only the top surface 102 radiates the visible light, because the visible light radiated by the bottom surface 104 is turned back by the opaque substrate 14. The reflector 22 is adjacent to the top surface 102 of the carbon nanotube array 10 and spaces from the carbon nanotube array 10. In not affecting aberration case, a distance between the reflector 22 and the carbon nanotube array 10 can be less than 80 mm, allowing the top surface 102 to irradiate more visible light. In one embodiment, a center of the top surface 102 of the carbon nanotube array 10 is located in a focus of the reflector 22.

A curvature radius of the reflector 22 can be in a range from about 10 mm to about 100 mm, to obtain more visible light. In one embodiment, the curvature radius of the reflector 22 is 88 mm, an object aperture angle of the reflector 22 is greater than or equal to 22.5 degrees, a numerical aperture of the reflector 22 is greater than 0.38.

In one embodiment, the chamber 20 spaced from the imaging element 18 and the reflector 22 is located between the imaging element 18 and the reflector 22. The carbon nanotube array 10 is located between the substrate 14 and the reflector 22. The substrate 14 is located between the carbon nanotube array 10 and the imaging element 18.

A size of the imaging element 18 is related to the curvature radius of the reflector 22. In one embodiment, the size of the imaging element 18 is 8.47 mm, a height of the image is 3.8 mm. A diameter of a image defocused spot is less than 0.01 mm, 0.7 view field distortion is less than or equal to 1%, field region is less than 0.01 mm, an optical transfer function in 50 line pairs/mm is great than 0.8. The method for measuring light intensity distribution can distinguish detail which has a size of great than or equal to 10 microns.

The imaging element 18 can be a charge-coupled device (CCD), a complementary metal-oxide-semiconductor (CMOS). In one embodiment, the imaging element 18 is a CCD, a size of a picture element of the CCD is less than 10 microns.

Figure 2:
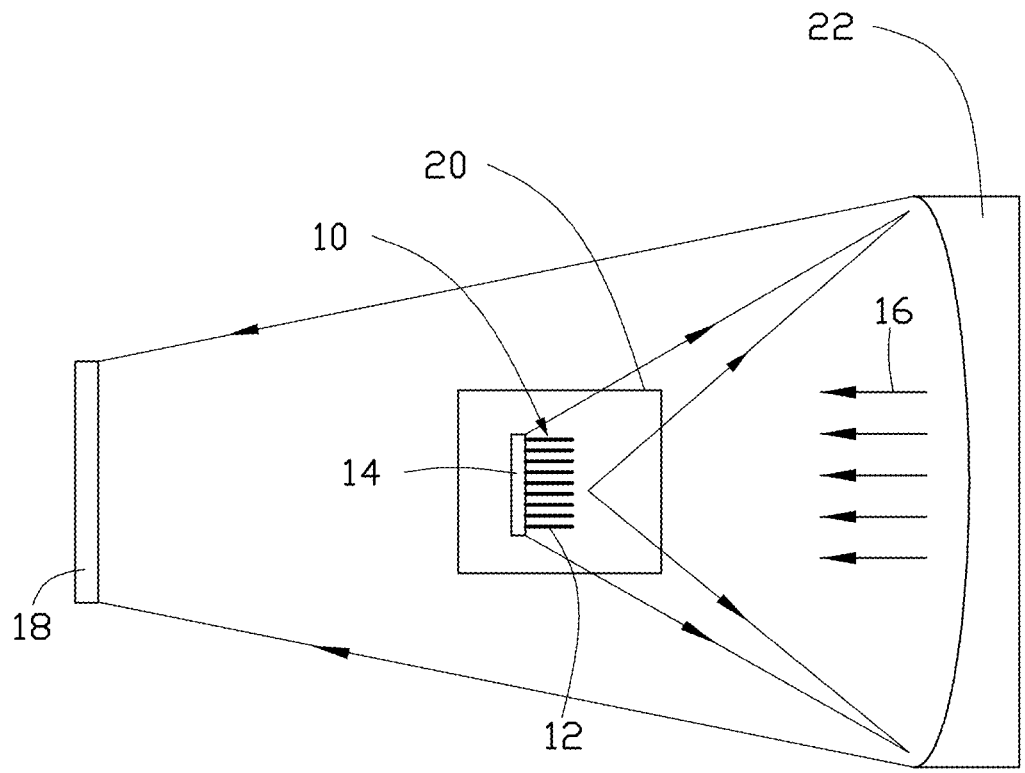
FIG. 2 is a schematic view showing an optical path with the system for measuring light intensity distribution.

Referring to FIG. 2, a method for measuring light intensity distribution of one embodiment with the system 24 includes the following steps:

(S21), providing a light source irradiating the top surface 102 of the carbon nanotube array 10, to make the carbon nanotube array 10 radiate a visible light;

(S22), reflecting the visible light with the reflector 22; and (S25), imaging the visible light reflected by the reflector 22 with an imaging element 18, to obtain an intensity distribution of the light source.

In step (S21), the light source can be infrared light, ultraviolet light. In one embodiment, an infrared light is used as the light source. The top surface 102 of the carbon nanotube array 10 adjacent to the light source and the bottom surface 104 is away from the light source.

In step (S21), an irradiating angle of the light source can be selected according to need, which is between a light beam 16 from the light source and the top surface 102 of the carbon nanotube array 10. In one embodiment, the irradiating angle is 90 degrees such that the light beam 16 is substantially vertical to the top surface 102 of the carbon nanotube array 10 and parallel to an axis of each of the carbon nanotubes 12.

While irradiating the top surface 102 of the carbon nanotube array 10 with the light beam 16, the top surface 102 of the carbon nanotube array 10 absorbs photons of the light source and produces heat, due to carbon nanotube array 10 having an ideal black body structure. The higher the intensity of the light source, the more photons that are absorbed by the top surface 102 of the carbon nanotube array 10, and the more heat will be produced by the top surface 102. Each of the carbon nanotubes 12 has evidently heat conduction anisotropy. Heat is conducted along the axis of the carbon nanotube 12 and is hardly conducted along a direction vertical to the axes of the carbon nanotubes 12. Therefore, the heat of each of the carbon nanotubes 12 has been conducted along a direction from the top end 122 to the bottom end 124, until each of the carbon nanotubes 12 has equal and uniform heat. Meanwhile, the carbon nanotube array 10 radiates the visible light, due to carbon nanotube array 10 having an ideal black body structure.

In detail, when the light beam 16 irradiates the top surface 102 of the carbon nanotube array 10, for example, a light with a higher light intensity in the light beam 16 irradiates a top end 122 of a carbon nanotube 12A. The top end 122 of the carbon nanotube 12A absorbs photons of the light source and produces more heat. The heat is conducted along the direction from the top end 122 to the bottom end 124, until the carbon nanotube 12A has equal and uniform heat. A light with a lower light intensity in the light beam 16 irradiates a top end 122 of a carbon nanotube 12B. The top end 122 of the carbon nanotube 12B absorbs photons of the light source and produces less heat. The heat is conducted along the direction from the top end 122 to the bottom end 124, until the carbon nanotube 12B has equal and uniform heat. Heat of the carbon nanotube 12A is more than heat of the carbon nanotube 12B. Meanwhile, the carbon nanotubes 12A and 12B radiate the visible lights, due to the carbon nanotubes 12 having an ideal black body structure. Therefore, a light intensity of the visible light radiated by the carbon nanotubes 12A is higher than a light intensity of the visible light radiated by the carbon nanotubes 12B.

Light intensity of the visible light radiated by each of the carbon nanotubes 12 in the carbon nanotube array 10 is related to light intensity of the light source. The higher the intensity of the visible light radiated by one of the carbon nanotubes 12, the more heat will be produced by the top end 122 of each of the carbon nanotubes 12, the higher the intensity of one light irradiating the top end 122 of each of the carbon nanotubes 12.

The substrate 14 is made of silicon, which is opaque. The bottom surface 104 of the carbon nanotube array 10 connects to the substrate 14. Therefore, visible light radiated by the bottom of the carbon nanotube array 10 is turned back by the substrate 14.

In step (S22), the visible light from the carbon nanotube array 10 irradiates the reflector 22, and is reflected by the reflector 22 to the imaging element 18.

In step (S23), after imaging the visible light reflected by the reflector 22 with the imaging element 18, the intensity distribution of the light source can be obtained by reading the imaging element 18. A computer can be used for reading the imaging element 18 to obtain the intensity distribution of the light source.

In summary, the system for measuring intensity distribution of light can be at room temperature. The system for measuring intensity distribution of light has higher sensitive and resolution, and can distinguish detail, which has a size of greater than or equal to 10 microns. Moreover, the system for measuring intensity distribution of light is simple and easy to operate.

It is to be understood that the above-described embodiment is intended to illustrate rather than limit the disclosure. Variations may be made to the embodiment without departing from the spirit of the disclosure as claimed. The above-described embodiments are intended to illustrate the scope of the disclosure and not restricted to the scope of the disclosure.

It is also to be understood that the above description and the claims drawn to a method may include some indication in reference to certain steps. However, the indication used is only to be viewed for identification purposes and not as a suggestion as to an order for the steps.

What is claimed is:

1. A system for measuring intensity distribution of light comprising:
    a light source emitting photons;
    a substrate having a surface;
    a carbon nanotube array comprising a plurality of carbon nanotubes on the surface of the substrate, wherein the carbon nanotube array absorbs the photons of the light source and radiates visible light, and angles between the plurality of carbon nanotubes and the surface of the substrate are in a range from about 10 degrees to about 90 degrees;
    a reflector configured to reflect the visible light and being spaced from the carbon nanotube array, wherein the carbon nanotube array is located between the reflector and the substrate; and
    an imaging element capable of imaging the visible light, wherein the imaging element is spaced from the substrate.

2. The system of claim 1, wherein the carbon nanotube array and the substrate is located in an environment of inert gas or a vacuum environment.

3. The system of claim 1, wherein the carbon nanotube array comprises a plurality of carbon nanotubes are parallel to each other.

4. The system of claim 1, wherein the plurality of carbon nanotubes are perpendicular to the surface of the substrate.

5. The system of claim 1, wherein the substrate is between the carbon nanotube array and the imaging element.

6. The system of claim 1, further comprising a chamber made of light-transparent materials, the carbon nanotube array with the substrate is located in the chamber.

7. The system of claim 6, wherein the chamber is filled with nitrogen, ammonia or inert gas.

8. The system of claim 6, wherein a pressure in the chamber is in a range from about $10^{-9}$ Pa to about $10^{-3}$ Pa.

9. The system of claim 6, wherein the chamber is spaced from the reflector and the imaging element and is between the reflector and the imaging element.

10. The system of claim 1, wherein the light source emits infrared light or ultraviolet light.

11. The system of claim 1, wherein the carbon nanotube array comprises a top surface and a bottom surface opposite to the top surface, the bottom surface connects to the surface of the substrate.

12. The system of claim 11, wherein an irradiating angle between a light beam from the light source and the top surface of the carbon nanotube array is 90 degrees.

13. The system of claim 12, wherein the light beam is substantially vertical to the top surface of the carbon nanotube array and parallel to an axis of each of the plurality of carbon nanotubes.

14. The system of claim 11, wherein a center of the top surface of the carbon nanotube array is placed at a focus point of the reflector.

15. The system of claim 11, wherein when the system is in operation, the top surface of the carbon nanotube array is irradiated by the photons emitted by the light source, and the carbon nanotube array radiates the visible light; the reflector reflects the visible light to the imaging element; and the imaging element images the visible light to obtain an intensity distribution of the light source.

16. The system of claim 1, wherein a distance between the reflector and the carbon nanotube array is less than 80 millimeters.

17. The system of claim 1, wherein the imaging element is a charge-coupled device or a complementary metal-oxide-semiconductor.

18. A system for measuring intensity distribution of light comprising:
    a carbon nanotube array comprising a plurality of carbon nanotubes located in an environment of inert gas or a vacuum environment, the carbon nanotube array absorbs photons emitted from a light source and radiates visible light, and angles between the plurality of carbon nanotubes and the surface of the substrate are in a range from about 10 degrees to about 90 degrees;
    a reflector reflecting the visible light and being spaced from the carbon nanotube array; and an imaging element imaging the visible light and being spaced from the carbon nanotube array.

19. The system of claim 18, wherein the carbon nanotube array comprises a substrate and a plurality of carbon nanotubes on the substrate.

* * * * *